United States Patent [19]

Von Till

[11] Patent Number: 4,936,442
[45] Date of Patent: Jun. 26, 1990

[54] COMBINATION BOX BEAM CARRIER FOR NONMETALLIC CONTAINER POCKETS

[75] Inventor: Louis Von Till, St. Louis, Mo.

[73] Assignee: Barry-Wehmiller Company, St. Louis, Mo.

[21] Appl. No.: 292,368

[22] Filed: Dec. 30, 1988

[51] Int. Cl.⁵ .................................. B65G 17/16
[52] U.S. Cl. .................. 198/803.01; 198/803.15
[58] Field of Search .......... 198/803.01, 803.8, 803.14, 198/803.15; 134/62, 72, 131, 166 R

[56] References Cited

U.S. PATENT DOCUMENTS

| | | | |
|---|---|---|---|
| 852,345 | 4/1907 | Paul | 198/803.01 |
| 1,756,554 | 4/1930 | Hippenmeyer | 198/803.01 |
| 2,051,091 | 8/1936 | Ladewig et al. | 198/803.15 |
| 2,522,912 | 9/1950 | Weiss | 198/803.01 |
| 2,804,966 | 9/1957 | McCabe | 198/803.14 |
| 2,984,334 | 5/1961 | Dungfelder et al. | 198/803.15 |
| 3,090,478 | 5/1963 | Stanley | 198/803.01 X |
| 3,150,765 | 9/1964 | Ellis | 198/803.01 |
| 3,474,894 | 10/1969 | Ciongwa et al. | 198/803.15 |
| 3,981,389 | 9/1976 | Babunovic et al. | 198/803.15 |
| 4,284,189 | 8/1981 | Vamvakas | 198/803.15 |
| 4,398,880 | 8/1983 | Seiling | 198/803.14 X |
| 4,778,045 | 10/1988 | Grüne et al. | 198/803.14 X |
| 4,807,421 | 2/1989 | Araki et al. | 198/803.01 X |

FOREIGN PATENT DOCUMENTS 0159821 7/1920 United Kingdom ........... 198/803.14

Primary Examiner—Robert J. Spar
Assistant Examiner—James R. Bidwell
Attorney, Agent, or Firm—Gravely, Lieder & Woodruff

[57] ABSTRACT

The present invention is directed to a box beam carrier composed of essentially two facing channel members with a series of openings in each of the channel members with the openings in aligned pairs to receive a preformed pocket which is snap-fitted in the pair of openings for ease of insertion or removal and so formed with the carrier that cleaning fluid is encouraged to flow through the pockets and remove labels and contaminants from the containers supported in the pockets. The pockets are of a nonmetallic material for the protection of containers against scuffing, chipping, or scratching that would be particularly detrimental to containers formed of glass or other hard surface-type containers.

6 Claims, 3 Drawing Sheets

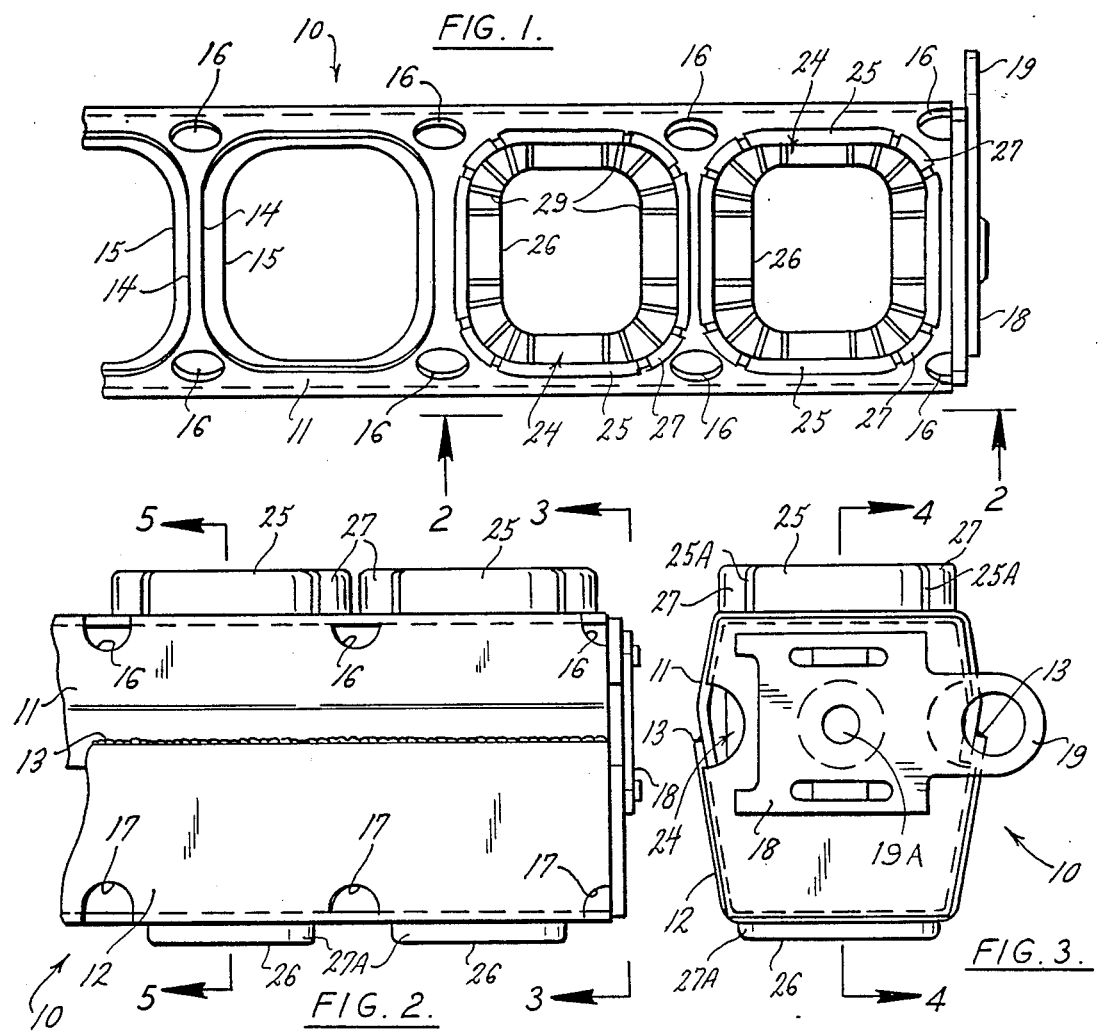
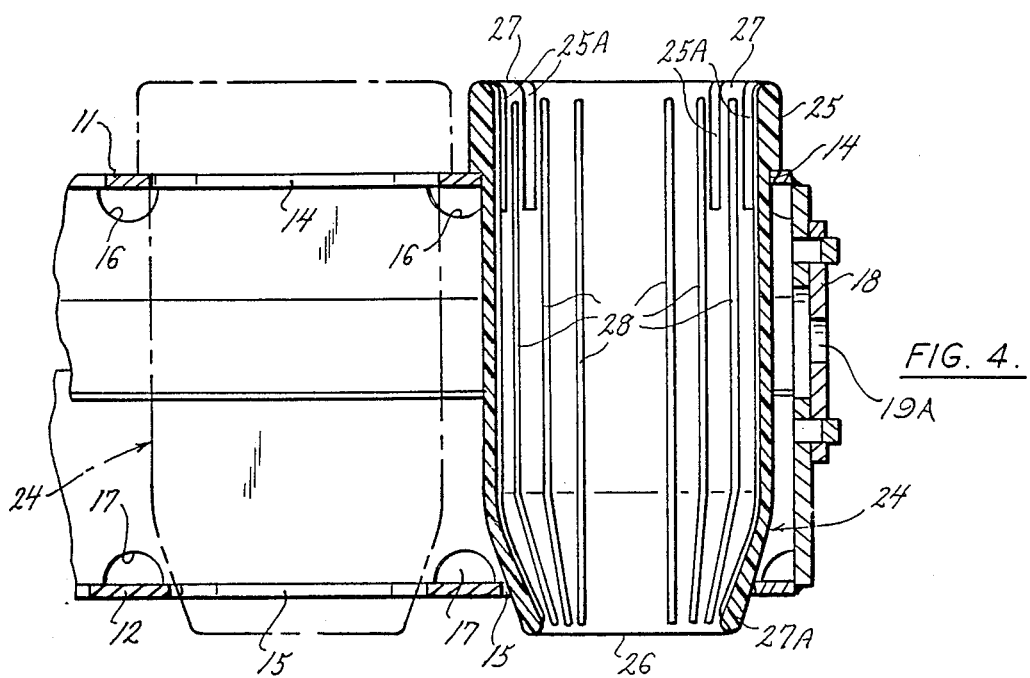

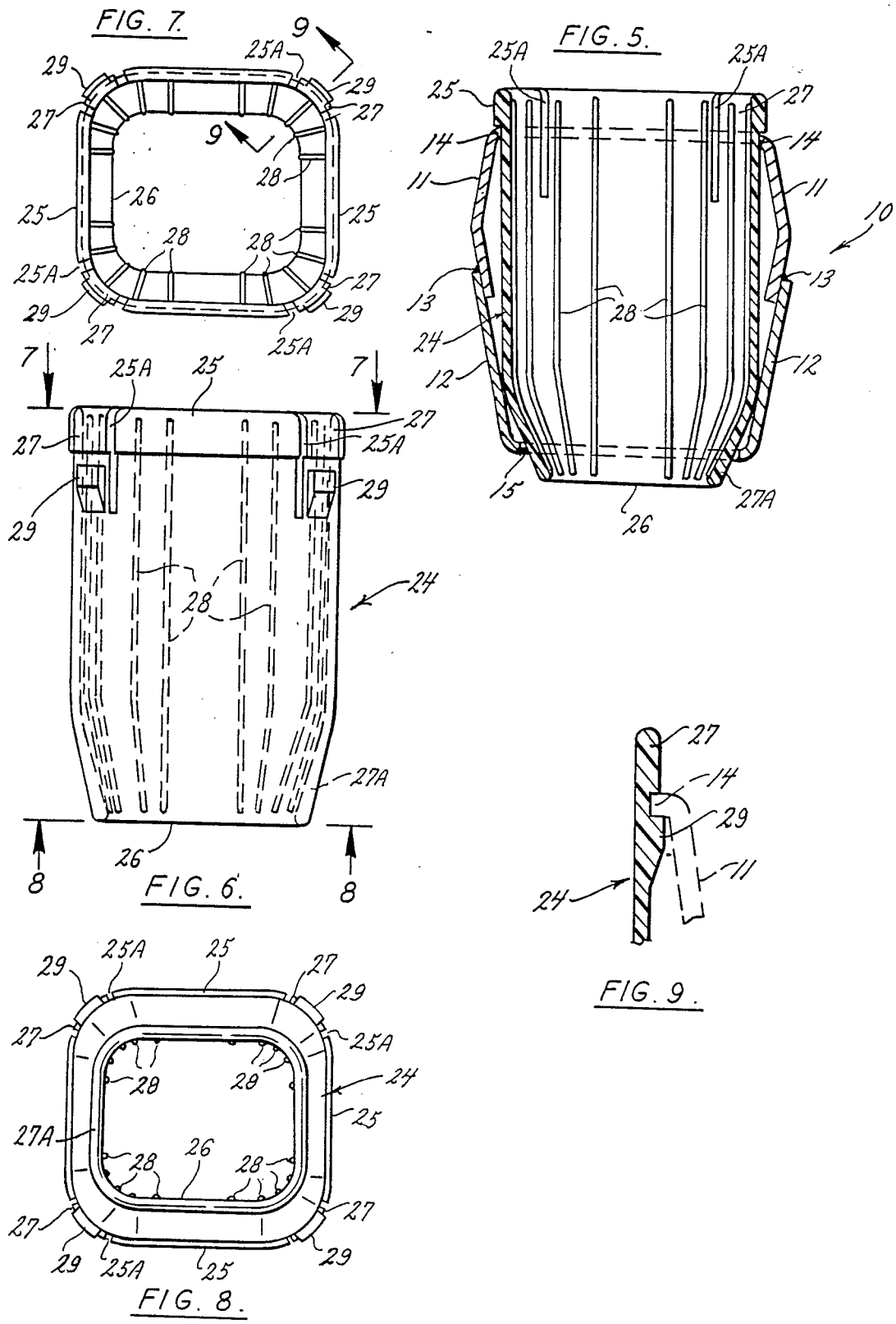

COMBINATION BOX BEAM CARRIER FOR NONMETALLIC CONTAINER POCKETS

BACKGROUND OF THE INVENTION

1. Scope of the Invention

This invention is concerned with the protection of containers against scuffing and scratching by combining nonmetallic container pockets in metallic carriers moving through cleaning apparatus.

2. Description of the Prior Art

The prior art relating to container washers and cleaners is represented by washers providing metallic carriers supporting rows of metal pockets that are shaped to receive containers, neck first, usually. The loading mechanism forces the containers to slide into the pockets, normally without regard for the amount of force applied to the bottom of the containers or without regard to the alignment of the dispensing end of the containers. The result is that some containers are chipped, scratched and overtime sustain scuffed side surfaces which detracts from the appearance of the container.

The scratching and chipping in the crown ring area of a container is entirely unwanted as leaks can form under the normal closure, and such treatment can make screw-on caps difficult to take off.

BRIEF DESCRIPTION OF THE INVENTION

An important object of the invention is to form a container receiving pocket that protects the surfaces of the container from nicks, surface scuffs and abrasions which lead to rejection of containers.

Another object of the invention is to configure the pocket, as well as the pocket conveying structure, so that labels to be washed off are not able to find places to hang on to.

Yet another object of the invention is to configure the container pockets and the supporting conveying structure so that the washing fluid is forced to flow through the pockets and wash labels and foreign matter out of the pockets, while blocking all but a bare minimum of fluid passing between the outside of adjacent pockets.

Another object of equal importance is to form a pocket of a nonmetallic material which can be molded to a shape for snap-in assembly in a box-type beam furnishing a substantially rigid structure, and in which the beam provides a container neck opening that is generally rectangularly shaped so as to furnish clearances for fluid flow around the container while minimizing container flutter and deflection while loading or discharging.

The invention also has as an object, the construction of container supporting box-type beams having a shape in cross section that allows the beams to move around curved paths in close proximity so that fluid solutions are restricted from flowing between the beams, whereby the washing solution is forced to flow through the pockets to wash out labels and foreign matter without having such matter hang up on the beams or in the pockets.

BRIEF DESCRIPTION OF THE DRAWINGS

The present invention in its preferred form is illustrated in the following drawings, wherein:

FIG. 1 is a fragmentary view of the metallic carrier as seen from the back side with some openings occupied by container pockets;

FIG. 2 is a fragmentary side elevational view taken along line 2—2 in FIG. 1;

FIG. 3 is an end view taken along line 3—3 in FIG. 2;

FIG. 4 is a fragmentary view of a typical nonmetallic container pocket shown in section and installed in one space in the carrier as depicted along line 4—4 in FIG. 3;

FIG. 5 is a section view of a representative pocket as seen along 5—5 in FIG. 2 to show the relationship of the pocket and the carrier;

FIG. 6 is a side view of a typical nonmetallic pocket;

FIG. 7 is an end view of the pocket of FIG. 6, seen along line 7—7;

FIG. 8 is a view of the pocket of FIG. 6 as seen from the end opposite to FIG. 7;

FIG. 9 is a fragmentary sectional view taken along 9—9 in FIG. 7; and

DETAILED DESCRIPTION OF THE INVENTION

Figure 10A:
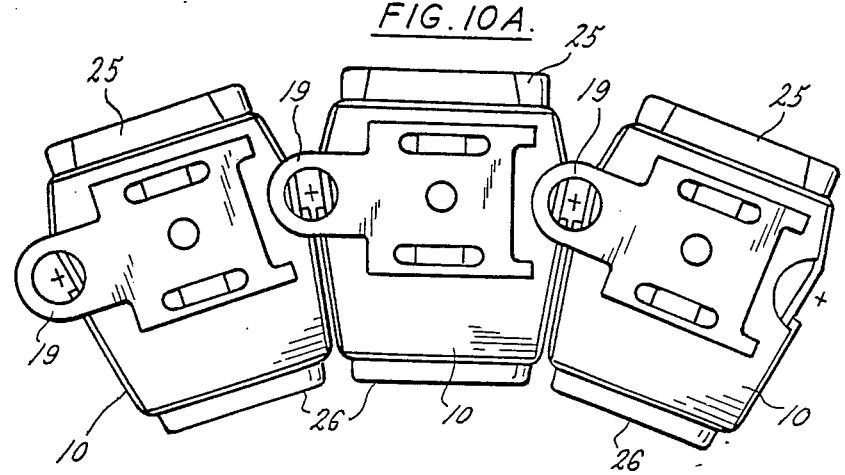
FIGS. 10, 10A and 10B illustrate the cooperation between carriers in linear and curving travel.

The metallic carrier 10 of FIGS. 1, 2 and 3 is made up of a pair of facing elongated channel section members 11 and 12 which are joined at the side overlapping margins by intermittent or continuous welds 13 that run lengthwise along the carrier 10 or by spotwelds. The upper channel member 11 has a flat face formed with a series of rectangular openings 14 (FIG. 1) and the lower member 12 has a flat face formed with a series of rectangular openings 15 which are smaller than the openings 14, and openings 14 and 15 are aligned. The member 11 is formed with drain openings 16, and other drain openings 17 are formed in the member 12. The sides of the two members 11 and 12 are shaped to provide a restriction of washing fluid flow between adjacent carriers as they are moved in a straight line, around a curve or on a sprocket by action of the plates 18 which connect with the propelling chain through pin eyes 19 and bolt hole 19A. It is thought not necessary to show the chain itself. The adjacent carriers 10 can arrange themselves in a curved or straight path with the faces in close adjacency to force substantial flow of the washing fluid through the pockets, which will be assembled into the rectangular openings, thereby removing labels and dirt.

Turning now to FIGS. 4–8 there is shown the nonmetallic container supporting pocket. FIG. 4 is a section view showing the internal shape of the pocket body 24, in which the loading open first end 27 is formed with an enlarged and thickened rim 27, the body itself is generally rectangular (FIGS. 7, 8) and the neck receiving second end has a constricted mouth 26 and formed with a thickened wall 27A. The interior of the pocket body 24, beginning at the open first end 27 with the rim 25, is formed with elongated ribs 28 which are spaced apart to form passages which encourage the flow of washing solution in the spaces between ribs 28.

The pocket body 24 is formed at each of its corners with axially directed slots 25A at each side of a snap-lock (See FIGS. 6 and 7) rim device which includes a retaining tab 29 (FIG. 9) spaced axially apart from the thickened rim 25. That space is provided to receive the inwardly directed terminal end of the opening 14, thereby securing the body 24 of the pocket at each of the corners as seen in FIG. 6.

FIGS. 4, 5 and 9 show the mounting of a pocket 24 in the aligned openings 14 and 15 of one space in the box-like carrier 10. In the view of FIG. 4 which is a section of the pocket 24, there is plainly shown a system of ribs 28 extending for a substantial axial length of the interior of the pocket. When the pocket 24 is fully snap-fitted into the receiving opening in the carrier 10, the tabs 29 are compressed inwardly as they pass the inturned rim of opening 14 and then snap back so the terminal end 11 is captured in the space between the tabs 29 and the thickened rim 27 which is exposed at the exterior of the carrier. The snap-locking of the rim 27 in the carrier 10 also positions the opposite thickened end 27A exposed at the opening 15. This mounting arrangement is duplicated for each pocket throughout the length of the carrier 10. That length may be long enough for 40 pockets, more or less depending on requirements.

The foregoing description has detailed the assembly in a fabricated steel or metallic box-section carrier 10 with representative nonmetallic pockets 24 for receiving and supporting containers through a cleaning machine (not shown, which may have the characteristics of washers, such as in U.S. Pat. Nos. 3,346,094 or 3,643,780).

The pockets 24 may be molded plastic material suitable for use in hot caustic washing solutions. The molded material, being nonmetallic, minimizes possible surface damage to containers, especially glass, during the loading, washing and unloading steps of the process. The substantially straight sided container neck opening and body shape maximizes the cross sectional area available between the container and pocket to promote washing fluid entry, flow through and escape of labels and dirt. It is especially noteworthy that the raised ribs 28 afford easy release of labels from adherence to the container and to the pocket interior walls, and readily allow labels to move as the washing solutions flow and oscillate through the pockets. The thickened rim area 25 and neck area 27A reinforce the pocket to withstand container impact through thousands of loading cycles, and it also provides for any expected gradual loss of the plastic material due to wear. The reinforced nature of the pocket is able to resist abuse from container jams at the loading area. Furthermore, the pocket is able to accommodate a variety of container sizes and shapes. The snap-in pocket can easily be inserted or removed at many convenient locations in the travel of the carriers. The corner locations of the rim 27 and locking tabs 29 facilitate the insertion or removal manipulation, and the simple straight pocket shaping promotes economics of tooling and manufacture of such pockets.

The metallic box-section for the carrier 10 provides the structure so necessary to limit bending deflection for carriers, and the arrangement of the channel members 11 and 12 makes the carrier an inexpensive assembly, as well as providing support for the pocket during loading cycles and obtaining long service life of the pockets. The simple clean lines eliminates places for label "hang-on" to occur during washing.

Figure 10:
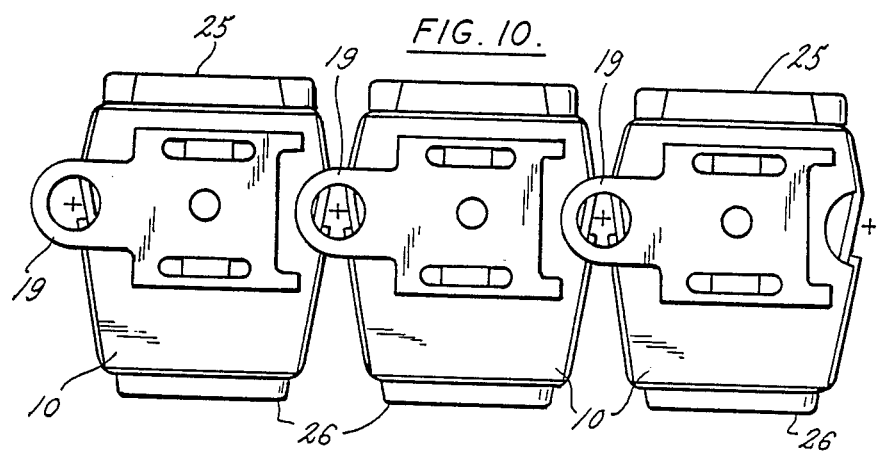
Figure 10B:
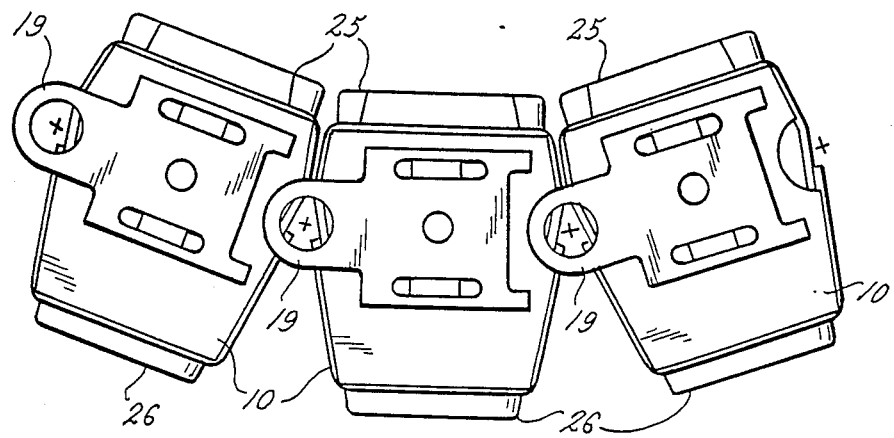

Turning now to the drawing sequence seen in FIGS. 10, 10A and 10B, there is shown an advantage achieved by the present pocket carrier 10 shown in an individual view in FIG. 3 and in section in FIG. 5. FIG. 10 shows a group of side-by-side carriers 10 moving in a straight line with the loading ends 25 uppermost and the container receiving neck end down. In this attitude the carriers 10 are close together in the area where the chain pin connecting eyes 19 are located. This closeness of the side walls 11 and 12 creates a restriction for the fluid flow, thus effectively forcing the greater volume of fluid to flow through the pocket where there is substantially less restriction and where the flow is desired to flush out labels and foreign material.

On the other hand FIG. 10A illustrates the relative positions of several carriers 10 during the travel around a curve with the neck ends 26 of the respective pockets 24 converging toward the inner side of the curving path, when the carriers 10 move in the oppositely directed curved path so the load end 25 of the pockets 24 converge. In either of these positions of convergent neck ends 26 or load ends 25, the resistance to fluid flow between pockets and carriers is substantially increased.

It can now be appreciated that the combination of a two-piece carrier of box-section character and a snap-in molded nonmetallic pocket attains the important objects of this invention.

What is claimed is:

1. In container washing apparatus the combination comprising:
   (a) a container carrier consisting of a first channel and a second channel secured together to form an elongated box-like beam, said first channel having a plurality of openings therein of a first predetermined size and said second channel have an equal plurality of openings therein in respective spaced alignment with said first channel openings, said second openings having a predetermined size different from said first predetermined size openings; and
   (b) a container supporting pocket for each of said aligned openings in said container carrier, each of said pockets being elongated to span the distance between said first and second channel openings and having thickened opposite end rims extending outwardly from said respective channel openings, whereby each of said pockets is securely reinforced in position.

2. The combination set forth in claim 1 wherein each of said container carriers is formed of metallic channel members having side walls secured to form said box-like beam and said carriers are pivotally interconnected to cooperate with each other to limit the flow of washing solution between said side walls.

3. The combination set forth in claim 1 wherein said container supporting pockets are in a molded plastic form having internal ribs extending lengthwise between said end rims in laterally spaced relation.

4. The combination set forth in claim 1 wherein each of said container supporting pockets is formed with means for removably snap-locking the same in said container carrier.

5. A non-metallic pocket for use in a metallic carrier with other similar pockets for containers received in each of the the non-metallic pockets, said individual pockets comprising:
   (a) an elongated body having a generally rectangular shaped body in section with rounded corners and linear sides, said body having a container receiving opening at one end and an opposite container supporting open end, said body having a wall of substantially uniform thickness between said ends;
   (b) said container receiving opening having a circumferentially extending rim which is thicker than said body wall, said circumferential rim being interrupted by segments at each corner separated from said body wall such that said segments are movable independently of said linear sides to positions to reduce the dimensions of said body shape in said thicker rim; and (c) said opposite open end having a margin that is thicker than the thickness of said body wall, said opposite end being uninterrupted throughout its periphery.

6. The pocket set forth in claim 5 wherein said independently movable segments being formed with tabs on the exterior of said body, which tabs are spaced from said thicker rim to provide a recess between said tabs and said thicker rim.

* * * * *